(12) United States Patent
Miguel et al.

(10) Patent No.: US 7,856,516 B2
(45) Date of Patent: Dec. 21, 2010

(54) INTERFACING INCOMPATIBLE SIGNALING USING GENERIC I/O AND INTERRUPT ROUTINES

(75) Inventors: John Flores Miguel, Pittsburg, CA (US); Bonnie H. Caballero, Sunnyvale, CA (US); Yasuhide Sato, San Ramon, CA (US); Barry Sia, Concord, CA (US); Paolo A. Tamayo, San Ramon, CA (US)

(73) Assignees: Kyocera Mita Corporation, Chuo-ku, Osaka-shi, Osaka (JP); Kyocera Technology Development, Inc., Concord, CA (US)

( * ) Notice: Subject to any disclaimer, the term of this patent is extended or adjusted under 35 U.S.C. 154(b) by 716 days.

(21) Appl. No.: 11/588,971

(22) Filed: Oct. 27, 2006

(65) Prior Publication Data
US 2008/0147913 A1    Jun. 19, 2008

(51) Int. Cl.
*G06F 13/12* (2006.01)
(52) U.S. Cl. .............................. 710/62; 710/35; 710/48; 710/66
(58) Field of Classification Search ............. 710/46–50, 710/32, 62, 66
See application file for complete search history.

(56) References Cited

U.S. PATENT DOCUMENTS

| | | | |
|---|---|---|---|
| 4,999,769 A | 3/1991 | Costes | |
| 5,581,669 A | 12/1996 | Voth | |
| 6,366,973 B1 | 4/2002 | Lo | |
| 2003/0188007 A1* | 10/2003 | Unger | 709/232 |
| 2003/0200373 A1* | 10/2003 | Kent | 710/305 |
| 2004/0088704 A1* | 5/2004 | Owen et al. | 718/100 |
| 2005/0066099 A1* | 3/2005 | Radhakrishna | 710/262 |
| 2005/0141257 A1 | 6/2005 | Kessels | |
| 2006/0168374 A1 | 7/2006 | Wray | |
| 2006/0168429 A1 | 7/2006 | Short | |
| 2006/0181547 A1 | 8/2006 | Loo | |

* cited by examiner

*Primary Examiner*—Eron J Sorrell

(57) ABSTRACT

A method for interfacing single transfer and burst transfer components, comprising: processing transfer completion of a byte in burst transfer as an interrupt; maintaining the current state of signal lines to prevent occurrence of next interrupt; copying the transferred byte from buffer to memory; and allowing next interrupt; and enabling sending of next byte in burst transfer. This invention interfaces incompatible signaling of the components, and solves the handshake, communication and buffering problems involved. The methods also include polling simulating an interrupt, prevention of premature transfer and overwrite, interrupt on an edge of a busy signal, disabling and enabling clock to maintain current status, packet exchange protocol involving header, body and checksum, command and status packets, copying task waiting on a blocking semaphore which is signaled by interrupt handler task, and signals from a first component routed to a conversion component which generates new signals compatible with the second component.

20 Claims, 8 Drawing Sheets

100

Packet Exchange Protocol

GENERAL FORMAT USED :

| 201<br>HEADER<br>(2 bytes) | 202<br>BODY<br>(0 - n bytes) | 203<br>CHECKSUM<br>(1 byte) |
|---|---|---|

PC to EC :

| COMMANDS | COMMAND BODY | COMMAND CHECKSUM |
|---|---|---|

EC to PC :

| STATUS | STATUS BODY | STATUS CHECKSUM |
|---|---|---|

FIG. 2

```
800  Pseudocode for software tasks

GetAllBytes( )
{
    Enable SBUSY interrupt;
    While (SDIR = 0)
    {
        Enable CCLK;
        Ret = SemaphoreWait (sem, timeout );

;;; Check Ret value if timeout occurred;
        If (Ret = timeout)
            Return NOT_OK;

Buffer[index++]
                = registerRead(receivedBytes);
    }
    Disable SBUSY interrupt;
    Return OK;
}

SBUSY_Interrupt( )
{
    Disable CCLK;
    SemaphoreSignal(sem);
}
```

FIG. 8

INTERFACING INCOMPATIBLE SIGNALING USING GENERIC I/O AND INTERRUPT ROUTINES

FIELD OF THE INVENTION

This invention relates to interfacing of communicating components, and more particularly to interfacing incompatible signaling between single-transfer and burst-transfer components using generic I/O and interrupt routines.

BACKGROUND OF THE INVENTION

When designing an electronic system using available components, an incompatible signaling is sometimes encountered. One such problem is interfacing between single-transfer and burst-transfer components; A single transfer component is designed to send and receive one unit (typically one byte) of information at a time. A burst transfer component is designed to send and receive multiple unites, or typically multiple bytes, at a time. Since the manners of transfer are different for the two kinds of components, there are problems of incompatible timing and signaling, which can lead to loss of data or incorrect communication. The problem may be made even more complex if there is a packet exchange protocol involved, or if the signal lines of the components follow different conventions and protocols regarding the busy states of the components, etc. The present invention arose out of the above perceived needs and concerns associated with interfacing incompatible signaling between single-transfer and burst-transfer components.

SUMMARY OF THE INVENTION

Methods, computer program products, computing and printing systems for interfacing of communicating components, and more particularly to interfacing incompatible signaling between single-transfer and burst-transfer components using generic I/O and interrupt routines are described. Embodiments of the present invention addresses related issues in interfacing and communication using a simple packet exchange protocol.

When designing an electronic system using available components, an incompatible signaling is sometimes encountered, which is especially common if the components would have been designed separately and independently. Embodiments of the present invention give solutions to the interfacing, signaling, communication, incompatibility, and buffering problems involved. By way of illustration, concrete sample problems in communication between a Printer Controller (PC) and Engine Controller (EC) and their solutions are presented in detail.

In an aspect of the present invention, interfacing single transfer and burst transfer components is accomplished by a method comprising: processing transfer completion of a byte in burst transfer as an interrupt; maintaining the current state of signal lines to prevent occurrence of next interrupt; copying the transferred byte from buffer to memory; and allowing next interrupt; and enabling sending of next byte in burst transfer.

In further aspects of the present invention, the methods also include polling simulating an interrupt, prevention of premature transfer and overwrite, interrupt on an edge of a busy signal, disabling and enabling clock to maintain current status, packet exchange, protocol involving header, body and checksum, command and status packets, copying task waiting on a blocking semaphore which is signaled by interrupt handler task, and signals from a first component routed to a conversion component which generates new signals compatible with the second component.

The invention will be more fully understood upon consideration of the detailed description below, taken together with the accompanying drawings.

DESCRIPTION OF THE DRAWINGS

FIG. 2 is a diagram showing the packet formats used in a packet exchange protocol, in accordance with a preferred embodiment of the present invention.

FIG. 8 is a pseudocode for software tasks, in accordance with a preferred embodiment of the present invention.

DETAILED DESCRIPTION OF THE INVENTION

In the following detailed description, numerous specific details are set forth in order to provide a thorough understanding of the present invention. However, it will be apparent to one of ordinary skill in the art that these specific details need not be used to practice the present invention. In other instances, well known structures, interfaces, and processes have not been shown in detail in order not to unnecessarily obscure the present invention.

Figure 1:
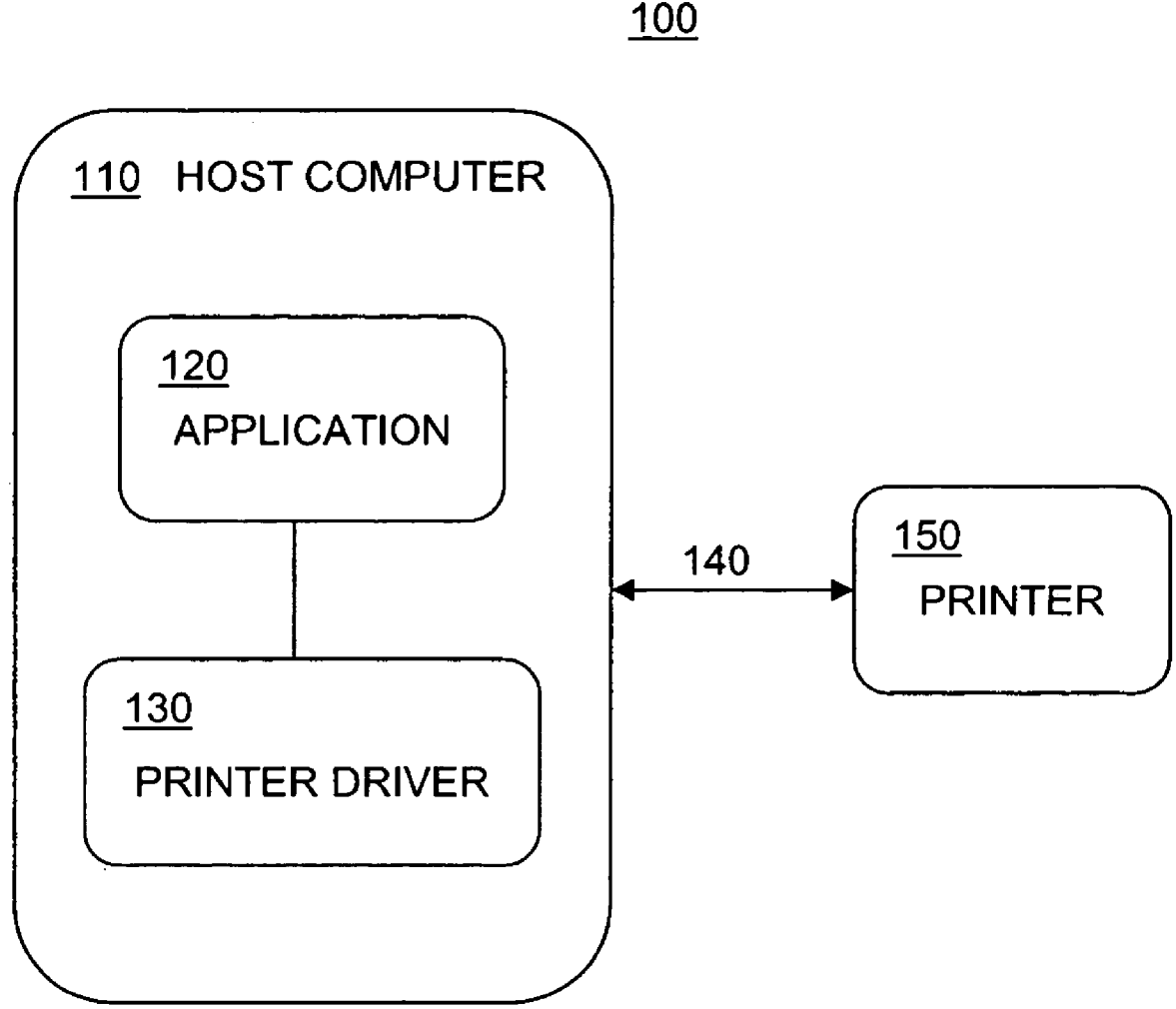
FIG. 1 is a simplified block diagram showing connection of a computing system to a printer, in accordance with a preferred embodiment of the present invention.

FIG. 1 is a simplified block diagram showing connection of a computing system to a printer, in accordance with a preferred embodiment of the present invention. FIG. 1 shows a general printing system setup 100 that includes a host computer 110 and a printer 150. Here, the printer 150 may be any device that can act as a printer, e.g. an inkjet printer, a laser printer, a photo printer, or an MFP (Multifunction Peripheral or Multi-Functional Peripheral) that may incorporate additional functions such as faxing, facsimile transmission, scanning, and copying.

The host computer 110 includes an application 120 and a printer driver 130. The application 120 refers to any computer program that is capable of issuing any type of request, either directly or indirectly, to print information. Examples of an application include, but are not limited to, commonly used programs such as word processors, spreadsheets, browsers and imaging programs. Since the invention is not platform or machine specific, other examples of application 120 include any program written for any device, including personal computers, network appliance, handheld computer, personal digital assistant, handheld or multimedia devices that is capable of printing.

The printer driver 130 is a software interfacing with the application 120 and the printer 150. Printer drivers are generally known. They enable a processor, such as a personal computer, to configure an output data from an application that will be recognized and acted upon by a connected printer. The output data stream implements necessary synchronizing actions required to enable interaction between the processor and the connected printer. For a processor, such as a personal computer, to operate correctly, it requires an operating system such as DOS (Disk Operating System) Windows, Unix, Linux, Palm OS, or Apple OS.

A printer I/O (Input/Output) interface connection 140 is provided and permits host computer 110 to communicate with a printer 150. Printer 150 is configured to receive print commands from the host computer and, responsive thereto, render a printed media. Various exemplary printers include laser printers that are sold by the assignee of this invention. The connection 140 from the host computer 110 to the printer 150 may be a traditional printer cable through a parallel interface connection or any other method of connecting a computer to a printer used in the art, e.g., a serial interface connection, a remote network connection, a wireless connection, or an infrared connection. The varieties of processors, printing systems, and connection between them are well known.

The present invention is suited for printer drivers, and it is also suited for other device drivers. The above explanations regarding FIG. 1 used a printer driver rather than a general device driver for concreteness of the explanations, but they also apply to other device drivers. Similarly, the following descriptions of the preferred embodiments generally use examples pertaining to printer driver, but they are to be understood as similarly applicable to other kinds of device drivers.

In any embedded controller system development it is common to see interfaces of modules or devices both on board and off board. Oftentimes these modules and devices would have been developed separately and independently of each other. One module might be a legacy device and the other a completely new design. It is also not uncommon to see some specifications of devices to be incompatible with each other especially when they have been separately developed with different design teams working on a different time frame. Integrating these modules will sometimes lead to a design error such as device interface specifications. When printer circuit boards are already designed and parts purchased, sometimes it is more economical to the product development management to find solution elsewhere rather than redesign the board from scratch with a new module.

Systems with a processor coupled with Generic Input/Output interfaces can be utilized to emulate the interface and solve the problem at hand. Since embedded processors usually come with the capabilities of a normal processor a set of routines together with interrupts can be created to emulate the required signaling and overcome the issue on interfacing. To illustrate the problem and solution using embodiments of the present invention let us take a simple example.

In printing systems there are two main controllers, the printer controller (PC) and the engine controller (EC). The printer controller takes care of the communication with the host, receives the print data, processes the print data and sends the processed print data to the engine controller. The engine controller on the other hand receives the processed print data, converts the print data to format that will be usable to print the data to a piece of printable media (laser or ink jet). The engine controller manages the toner or ink, the printing media and the mechanical operation of the printing action.

The printer controller (PC) and the engine controller (EC) interfaces are further classified into two groups: the engine interface and the video interface. The engine interface is used to communicate commands and status between the printer controller and the engine controller. Commands are bytes sent to the EC by the PC when changes in the printer settings are desired such as paper sizes, print orientation or image quality settings. Commands bytes are also used for initialization settings at power up, initiate printing, pause printing or stop printing. Status bytes on the other hand are received from EC to inform the PC if the command sent was successful or not. It is also used to inform PC of any abnormal conditions such as jam errors, out of paper errors or toner level information when PC inquires for such conditions. The video interface on the other hand is utilized to send the print data observing the video protocol (protocol common to printing) to transfer the processed print data. This is the channel used to send the actual print data for printing to the print media.

FIG. 2 is a diagram showing the packet formats used in a packet exchange protocol, in accordance with a preferred embodiment of the present invention. The EC and the PC components of the system utilize a simple packet exchange protocol to pass commands and status. A packet exchange protocol is composed of a data header, data body and checksum. The data header usually contains the address of the destination of the data. The data body contains the message or data to be sent, and the checksum component contains information to verify the data (packet) received is valid or not. The packet exchange protocol used in this example is a slightly modified one. Since the connection is not a bus type where multiple modules are connected to a generic bus connection but rather a one to one interface, the packet exchange protocol is modified slightly. The data header in this case will contain command or status identification code (ID). The command or status ID is based on a pre-defined list with corresponding body lengths ranging from 0 bytes to n bytes. The checksum portion is still retained to aid in verification of the received packets. The modified packet exchange protocol is illustrated in FIG. 2. The packet Header 201 is always 2 bytes in length. The packet Body 202 size is dependent on the header sent and the checksum 203 length is always 1 byte in length.

The exchange of packets between the two components is always initiated by the PC side. This is through some system level interrupts or signaling to force the operation to run a routine that addresses the EC request for attention. The PC side initiates this by sending a command packet. The EC side will respond using the status packet. Again the length of the command body and the status body will be dependent on the command ID and status ID respectively.

Figure 3:
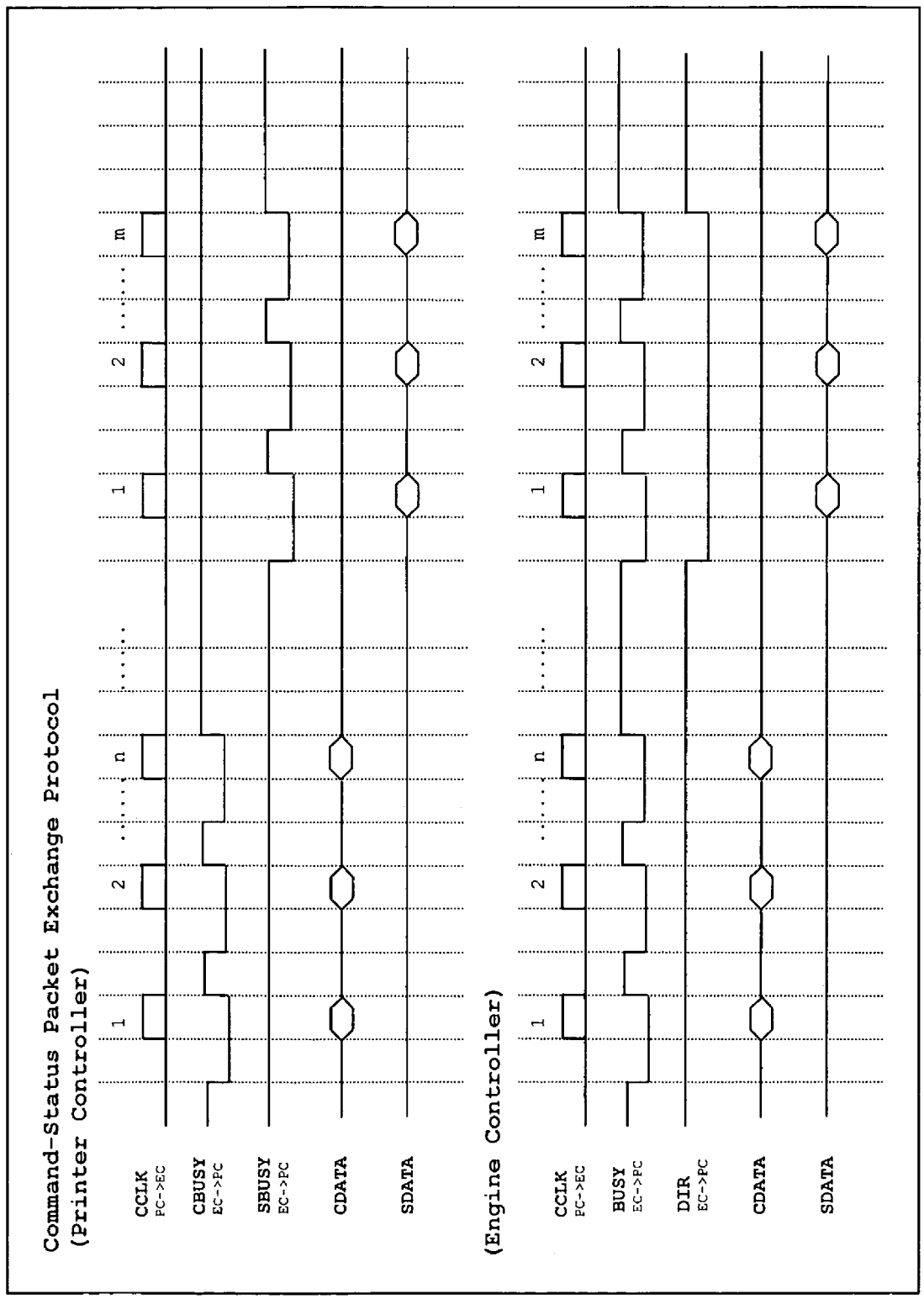
FIG. 3 is a diagram showing the timing charts for the signal lines of Printer Controller and Engine Controller, in accordance with a preferred embodiment of the present invention.

FIG. 3 is a diagram showing the timing charts for the signal lines of Printer Controller and Engine Controller, in accordance with a preferred embodiment of the present invention. The interface protocol used by the EC and PC to perform command and status communication is shown in FIG. 3. From the figure we see one major difference in the signals. The EC requires busy (BUSY) signal and direction (DIR) signal. BUSY will indicate that data sent by EC will be sampled by PC or data sent by PC will be sampled by EC depending on the DIR signal. The n and m values may or may not be equal and they vary depending on the number of bytes sent or received. This is dependent on the command or status ID described earlier. When DIR=1 and BUSY=0, CDATA signal is used to receive the command data bytes serially from the PC one byte (8 bits) at a time. EC will sample the CDATA line every rising edge of CCLK. CCLK is a signal generated on the PC side. When DIR=0 and BUSY=0, status data will be sent to the SDATA signal serially. PC will sample the status (8 bits) in the SDATA line every CCLK rising edge. On the PC side, SBUSY signal and CBUSY signal indicate which data line is being used. Instead of a DIR signal, CBUSY takes its place and this alone will indicate that the data will be coming from the EC side using the CDATA line. SBUSY will indicate that data will be coming from the PC side using the SDATA line. CCLK is also used to sample the data.

Figure 4:
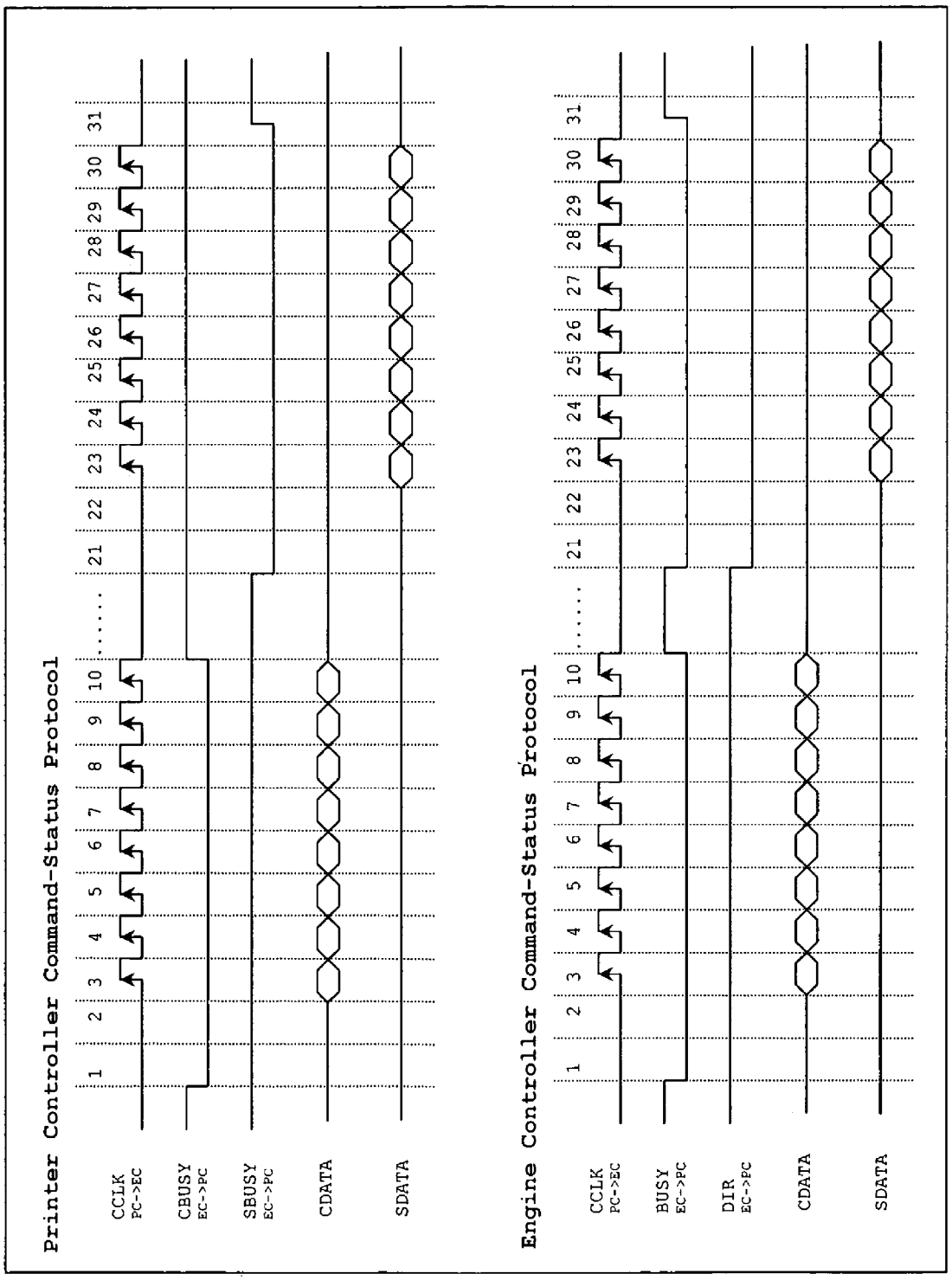
FIG. 4 is a diagram showing the zoomed-in timing charts showing individual bits of the transferred bytes for the signal lines of Printer Controller and Engine Controller, in accordance with a preferred embodiment of the present invention.

FIG. 4 is a diagram showing the zoomed-in timing charts showing individual bits of the transferred bytes for the signal lines of Printer Controller and Engine Controller, in accordance with a preferred embodiment of the present invention. FIG. 4 illustrates the bit sampling on the command and status transfers. The figure shows a close up view of the byte sampling for both the command and status transfers.

Figure 6:
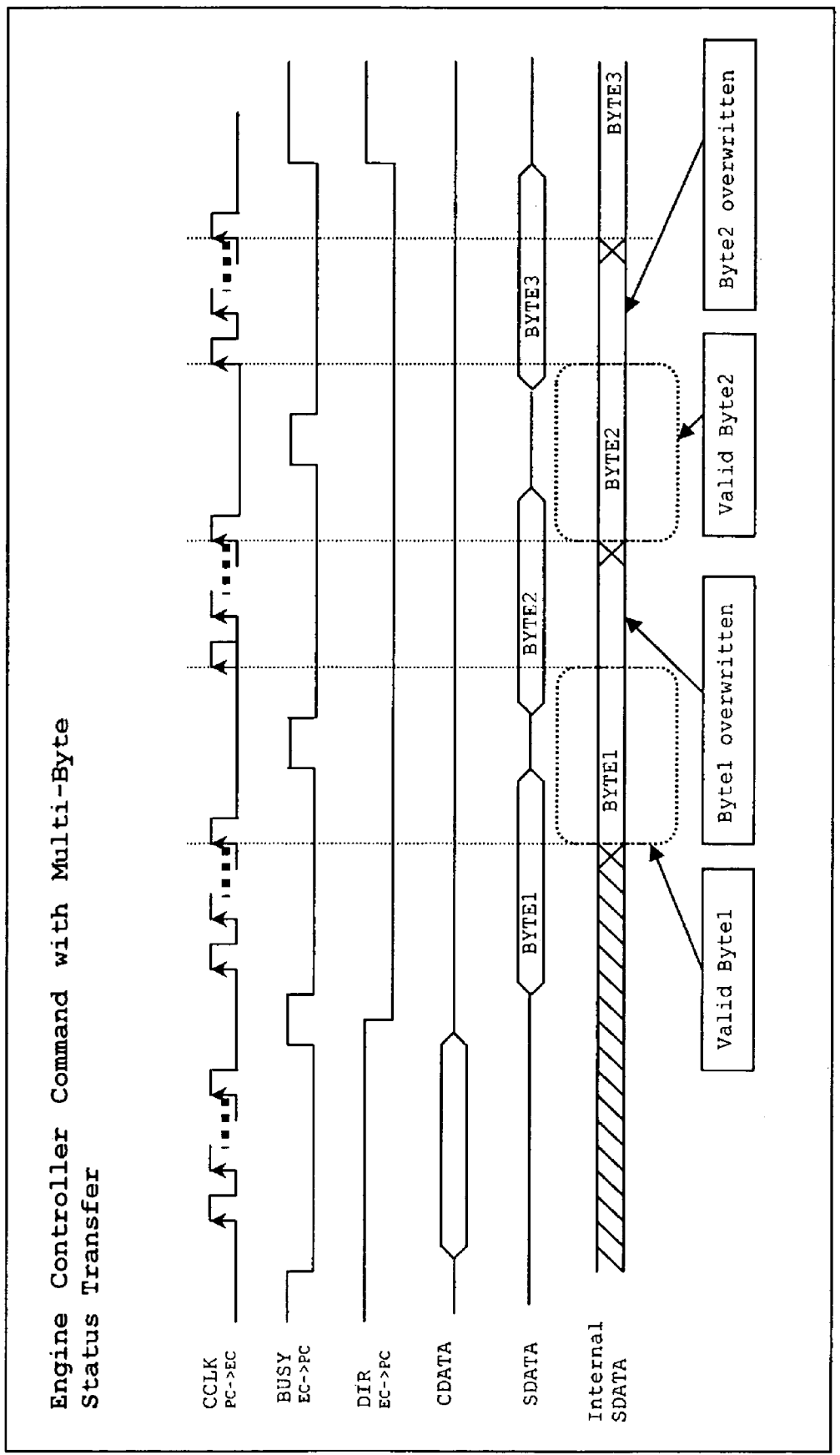
FIG. 6 is a diagram showing the details of the buffering problem between Printer Controller and Engine Controller, in accordance with a preferred embodiment of the present invention.

FIG. 6 is a diagram showing the details of the buffering problem between Printer Controller and Engine Controller, in accordance with a preferred embodiment of the present invention. The problem with the interface of the two modules is that there is an incompatibility on the signals used by each protocol. It is conceptually necessary to add glue logic to generate the SBUSY and CBUSY signal to the PC from the BUSY and DIR signals of the EC. Implementing glue logic will have an effect to the total cost of the board since an additional device will be required for the additional circuitry. Adding to the problem of signal incompatibility there is also a data buffering problem. In multi-byte status communication the EC immediately asserts SBUSY after the previous status byte is sent. This is illustrated in FIG. 6. After Byte1 is serially sampled in the PC there is a delay for the PC to get the latest sampled byte from the internal status data buffer. Since the EC has asserted SBUSY (SBUSY=0) immediately after the first byte, data in the internal status buffer can be overwritten with Byte2. This occurs since SBUSY is designed to directly control the CCLK. When SBUSY signal is sampled to be '0', CCLK signal is generated (8 clock edges) at the same time data is sampled from the SDATA line. Therefore, it is necessary to delay the generation of CCLK to force the EC to wait for the data to be retrieved from the buffer before new data can be sampled into the internal status data buffer.

These types of protocol incompatibility problems will require additional circuitry which adds up to that total system cost. By implementing some software routines and generic input/output (GPIO) pins coupled with the interrupt capability of the GPIO, additional hardware requirements can be eliminated. Implementing a software solution will affect the overall bandwidth of the protocol but if this does not affect system performance then it is a very good solution.

Figure 5:
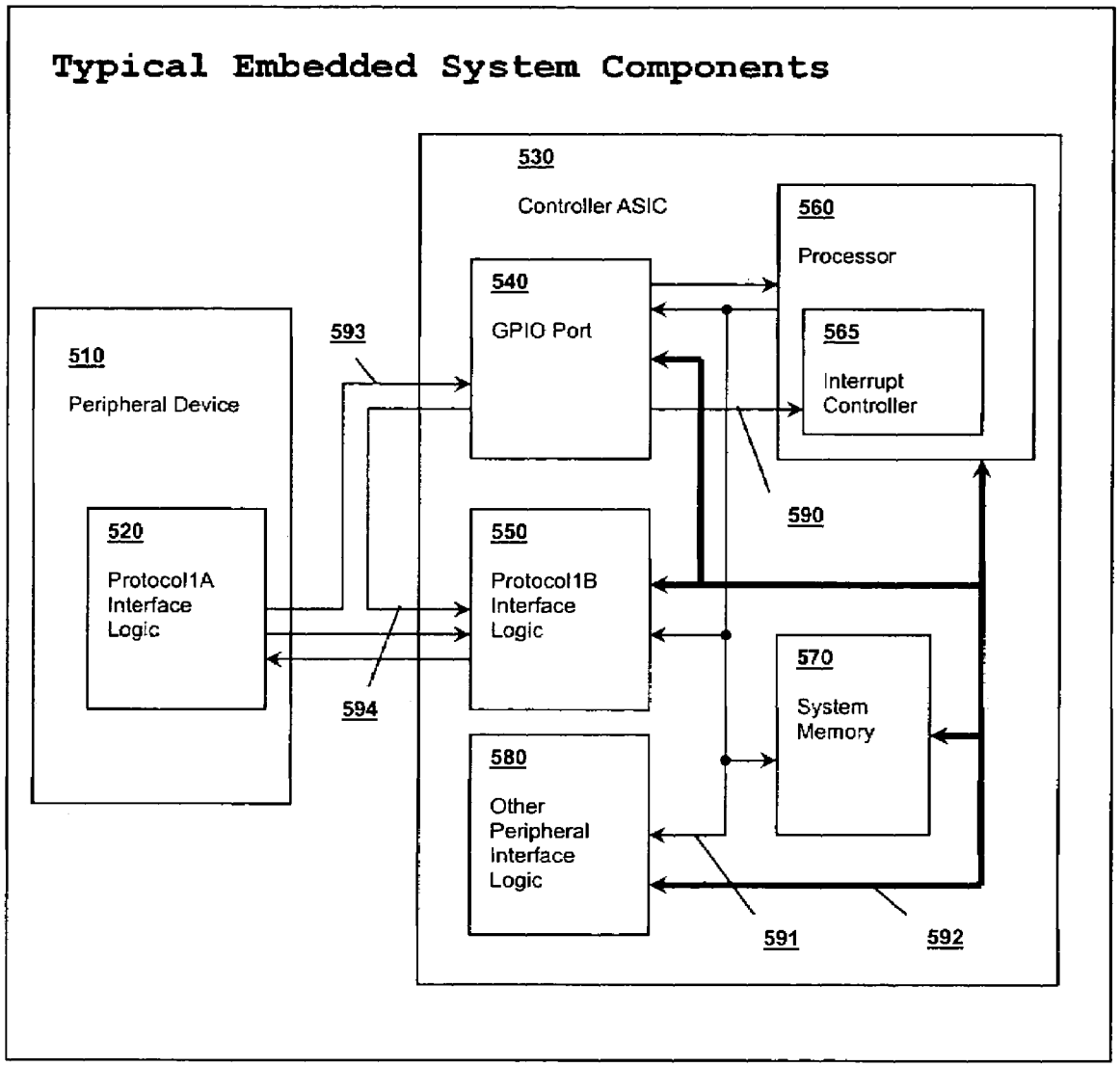
FIG. 5 is a block diagram showing components and connections of Printer Controller and Engine Controller, in accordance with a preferred embodiment of the present invention.

FIG. 5 is a block diagram showing components and connections of Printer Controller and Engine Controller, in accordance with a preferred embodiment of the present invention. The embodiments of the present invention involve the use of the existing components of a typical embedded system. FIG. 5 shows a portion of these typical components. The processor 560 is embedded in an ASIC 530 that contains the peripheral controllers 550 and 580. Protocol1B Interface Logic 550 is intended to interface with a Peripheral Device 510. Peripheral Device 510 implements Protocol1A Interface Logic 520. This makes the existing interface logic in the ASIC incompatible with the interface logic of the Peripheral Device 510.

Utilizing the Generic Processor Input/Output (GPIO) 540 in the ASIC coupled with a microcode that controls the interrupts, the problem of interfacing can be given a solution without any additional costs in terms of components in the board. The incompatible signal 593 is connected to the GPIO port of the ASIC. The chosen GPIO pin can be configured as input and set as one interrupt source. This enables the Interrupt Controller 565 of the Processor to detect the signal transition that is of interest. Based on this interrupt the system will have the ability to generate a new signal 594 from one of the available configured GPIO pins. This new signal will now be compatible with the expected protocol interface.

The generation of the new signal is based on the interrupt sub-routine of the interrupt source from GPIO 590 and/or the status of the interface logic 550 state-machine. The status of the interface logic state-machine can also be known through some interrupt source or through a task that routinely checks the status and generates an exception or a function call. The generated signal will be directly controlled by the Processor using writes to the configured GPIO port pin through the data bus 592. The generated signal can now be connected to the interface logic.

Based on the example given earlier the signals that are re-routed into the GPIO port are BUSY and DIR signals. Two signals from the GPIO port are generated to meet the SBUSY and CBUSY signals. As mentioned earlier, two problems are being fixed in this scenario. First is the problem of the definition of the two signals BUSY and DIR on the EC side and SBUSY and CBUSY on the PC side. The other problem is data overrun on the data buffer internal to the Protocol Interface 550. Bytes sampled on the status phase are overwritten prematurely due to the early assertion of the BUSY signal after the previous status byte is transferred.

To address the first, signaling problem, BUSY and DIR signals are re-routed to two GPIO ports configured as inputs. By sampling the BUSY signal and the DIR signal, a simple Boolean equation can be formulated to generate the SBUSY and CBUSY signals. A software task can be created to watch the BUSY and DIR signals. The transitions of these two signals can be used to generate the SBUSY and CBUSY signals. The software task can be interrupt based or polling based.

Figure 7:
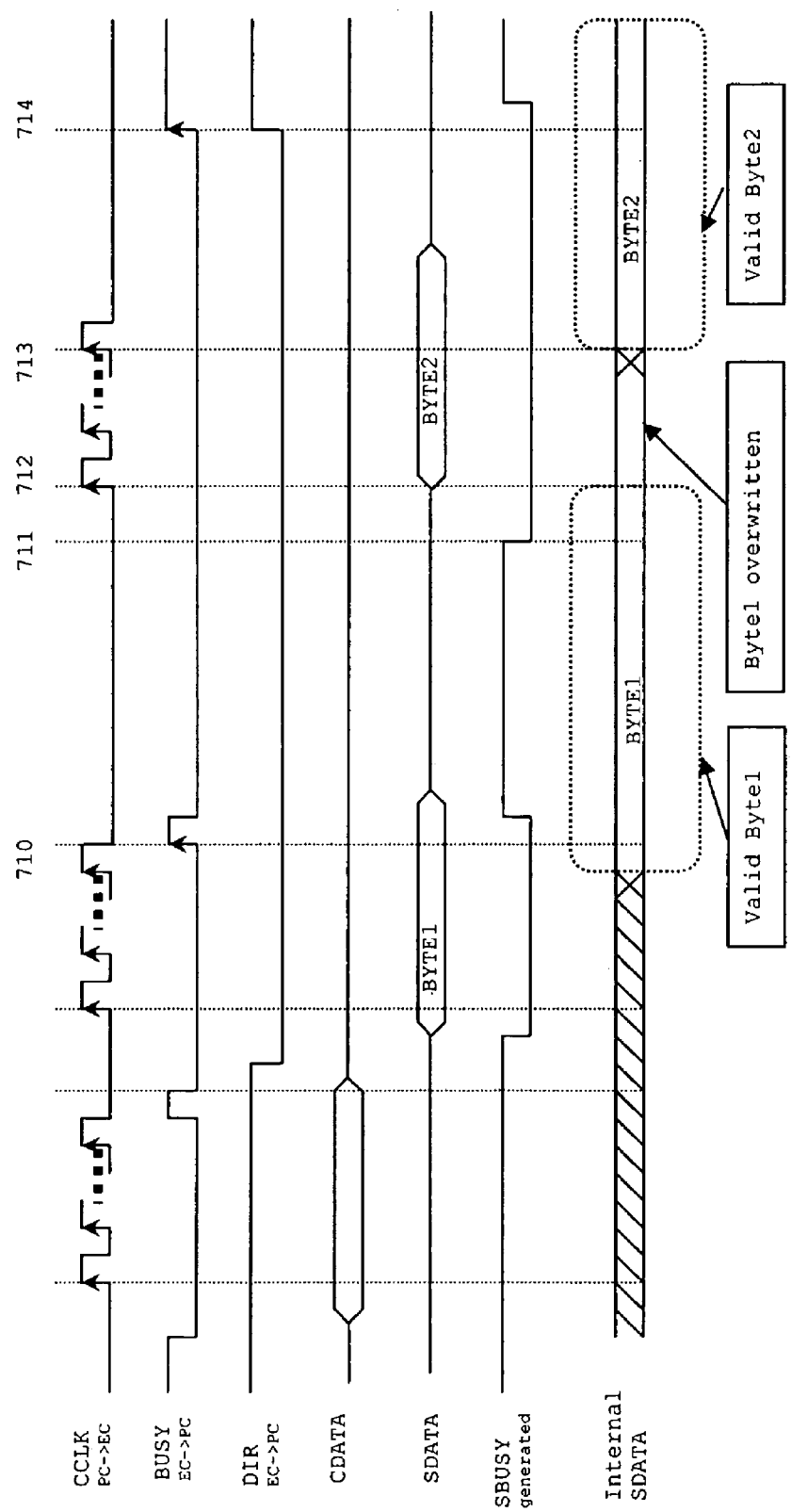
FIG. 7 is a diagram showing a solution to the buffering problem between Printer Controller and Engine Controller, in accordance with a preferred embodiment of the present invention.

FIG. 6 is a diagram showing the details of the buffering problem between Printer Controller and Engine Controller, in accordance with a preferred embodiment of the present invention. To address the second, buffering problem, SBUSY signal must be delayed until the data in the buffer is sampled and stored. To implement this, a routine is created that controls the CCLK signal. The generation of the SBUSY signal will be based on this routine and BUSY signal from the engine. This procedure is enumerated below, in reference to FIG. 7. FIG. 7 is a diagram showing a solution to the buffering problem between Printer Controller and Engine Controller, in accordance with a preferred embodiment of the present invention.

1. Interrupt from BUSY signal is detected. This interrupt is configured to be set on the rising edge of the BUSY signal. FIG. 7 shows the interrupt source 710 and 714.

2. Once the interrupt is detected, the interrupt source is masked along with the CCLK generator. If CCLK is not generated, the BUSY signal assertion is extended by EC.

3. Data from the buffer is read. Reading must occur before 711 to make sure that the data is valid. This will be the scenario for all other succeeding bytes.

4. After the data is read (before 711), the interrupt source and the CCLK generator is enabled 711. This will enable the EC to send the new status byte to the CDATA line every CCLK rising edge while PC is sampling the new status byte one bit at a time.

5. Steps 2 to 4 are repeated until all the status bytes are transferred.

The solution works well for both single byte status and multi-byte status. It does not give a distinction if the transfer is multi-byte or single byte. Speed of the transfer of the bytes is slowed down a bit but the overall system performance is not changed.

FIG. 8 is a pseudocode for software tasks, in accordance with a preferred embodiment of the present invention. An embodiment of the present invention requires a software component to control the signals being generated. This component will also be tasked to monitor the incoming signals and based on this the generated signals are toggled accordingly. An example of an application task that can control such signals is shown in FIG. 8. One task gathers all the bytes sent by the status phase of the protocol given in the example. The other task, the interrupt handler, does two things. It first disables the clock to prevent premature sending of the next byte. Then it signals the blocking semaphore. Here a blocking semaphore (or signaling semaphore) is initialized to zero. A blocking semaphore construct is very useful when the order of execution among tasks or threads needs to be controlled. When the GetA11Bytes performs the SemaphoreWait operation on the blocking semaphore, it is blocked and waits on it. The main function GetA11Bytes waits for this signal of the blocking semaphore. When the interrupt handler signals the blocking semaphore, announcing availability of new data, it wakes up the other task, GetA11Bytes. This ensures that the interrupt handler has been called before the main function proceeds.

Although this invention has been largely described using terminology pertaining to printer drivers, one skilled in this art could see how the disclosed methods can be used with other device drivers. The foregoing descriptions used printer drivers rather than general device drivers for concreteness of the explanations, but they also apply to other device drivers. Similarly, the foregoing descriptions of the preferred embodiments generally use examples pertaining to printer driver settings, but they are to be understood as similarly applicable to other kinds of device drivers.

Although the terminology and description of this invention may seem to have assumed a certain platform, one skilled in this art could see how the disclosed methods can be used with other operating systems, such as Windows, DOS, Unix, Linux, Palm OS, or Apple OS, and in a variety of devices, including personal computers, network appliance, handheld computer, personal digital assistant, handheld and multimedia devices, etc. One skilled in this art could also see how the user could be provided with more choices, or how the invention could be automated to make one or more of the steps in the methods of the invention invisible to the end user.

While this invention has been described in conjunction with its specific embodiments, it is evident that many alternatives, modifications and variations will be apparent to those skilled in the art. There are changes that may be made without departing from the spirit and scope of the invention.

Any element in a claim that does not explicitly state "means for" performing a specific function, or "step for" performing a specific function, is not to be interpreted as a "means" or "step" clause as specified in 35 U.S.C. 112, Paragraph 6. In particular, the use of "step(s) of" or "method step(s) of" in the claims herein is not intended to invoke the provisions of 35 U.S.C. 112, Paragraph 6.

What is claimed is:

1. A method for interfacing, without requiring changes to a burst transfer serial component, a single transfer serial component and the burst transfer serial component whose single transfer protocol and burst transfer protocol are incompatible, comprising:

providing a buffer and a memory connected to the single transfer serial component while the burst transfer serial component remains unchanged, using at least one signal line from a peripheral device as input and interrupt source for handshaking, and providing no further hardware modifications;

processing a completion of transfer of a byte from the burst transfer serial component to the single transfer serial component as an interrupt source event;

maintaining the current state of at least one line corresponding to the interrupt source event to prevent occurrence of a next interrupt source event;

reading the transferred byte from the buffer and copying the transferred byte to the memory;

ceasing the maintaining of the current state of the at least one line corresponding to the interrupt source event to allow occurrence of the next interrupt source event; and enabling sending of a next byte from the burst transfer serial component.

2. The method of claim 1, wherein the interrupt source event is simulated by a polling event;

preventing of the occurrence of a next interrupt source event prevents premature transfer of the next byte in the burst transfer causing the next byte to overwrite the buffer before it is sampled and copied; and the operation of the burst transfer component remains unchanged.

3. The method of claim 1, wherein the interrupt source event is an edge of a busy line of the burst transfer component;

the maintaining of the current state of at least one line corresponding to the interrupt source event to prevent occurrence of a next interrupt source event comprises disabling a clock line that controls transfer, causing the busy line of the burst transfer component to maintain the current state; and ceasing of the maintaining of the current state of the at least one line corresponding to the interrupt source event to allow occurrence of the next interrupt source event comprises enabling the clock line that controls transfer, causing the busy line of the burst transfer component to allow occurrence of an edge.

4. The method of claim 1, wherein the transferred byte is at least one byte constituting a packet in a packet exchange protocol, wherein a completion of a transfer of a packet is processed as a packet transfer completion event.

5. The method of claim 4, wherein a packet comprises a packet header, a packet body, and a packet checksum, and wherein a first component sends a component a command packet, to which the second transfer component responds by sending back to the first component a status packet.

6. The method of claim 1, wherein reading the transferred byte from a buffer and copying to memory is performed by a copying task, which waits on a blocking semaphore before reading and copying; and the interrupt source event invokes an interrupt handler task, which causes maintaining of the current state of at least one line corresponding to the interrupt source event to prevent occurrence of a next interrupt source event, and then signals the blocking semaphore.

7. The method of claim 1, wherein at least one signal line generated from a first component is routed to a conversion component;

the conversion component converting the at least one signal line to produce at least one new signal compatible with a protocol of a second component; and feeding the converted at least one new signal to the second component.

8. A computing system for interfacing, without requiring changes to a burst transfer serial component, a single transfer serial component and the burst transfer serial component whose single transfer protocol and burst transfer protocol are incompatible, comprising:
  providing a buffer and a memory connected to the single transfer serial component while the burst transfer serial component remains unchanged, using at least one signal line from a peripheral device as input and interrupt source for handshaking, and providing no further hardware modifications;
  processing a completion of transfer of a byte from the burst transfer serial component to the single transfer serial component as an interrupt source event;
  maintaining the current state of at least one line corresponding to the interrupt source event to prevent occurrence of a next interrupt source event;
  reading the transferred byte from the buffer and copying the transferred byte to the memory;
  ceasing the maintaining of the current state of the at least one line corresponding to the interrupt source event to allow occurrence of the next interrupt source event; and
  enabling sending of a next byte from the burst transfer serial component.

9. The computing system of claim 8, wherein the interrupt source event is simulated by a polling event;
  preventing of the occurrence of a next interrupt source event prevents premature transfer of the next byte in the burst transfer causing the next byte to overwrite the buffer before it is sampled and copied; and
  the operation of the burst transfer component remains unchanged.

10. The computing system of claim 8, wherein the interrupt source event is an edge of a busy line of the burst transfer component;
  the maintaining of the current state of at least one line corresponding to the interrupt source event to prevent occurrence of a next interrupt source event comprises disabling a clock line that controls transfer, causing the busy line of the burst transfer component to maintain the current state; and
  ceasing of the maintaining of the current state of the at least one line corresponding to the interrupt source event to allow occurrence of the next interrupt source event comprises enabling the clock line that controls transfer, causing the busy line of the burst transfer component to allow occurrence of an edge.

11. The computing system of claim 8, wherein the transferred byte is at least one byte constituting a packet in a packet exchange protocol, wherein a completion of a transfer of a packet is processed as a packet transfer completion event.

12. The computing system of claim 11, further comprising a print engine, wherein a packet comprises a packet header, a packet body, and a packet checksum, and wherein a first component sends a component a command packet, to which the second transfer component responds by sending back to the first component a status packet.

13. The computing system of claim 8, wherein
  reading the transferred byte from a buffer and copying to memory is performed by a copying task, which waits on a blocking semaphore before reading and copying; and
  the interrupt source event invokes an interrupt handler task, which causes maintaining of the current state of at least one line corresponding to the interrupt source event to prevent occurrence of a next interrupt source event, and then signals the blocking semaphore.

14. The computing system of claim 8, wherein at least one signal line generated from a first component is routed to a conversion component;
  the conversion component converting the at least one signal line to produce at least one new signal compatible with a protocol of a second component; and
  feeding the converted at least one new signal to the second component.

15. A computer program product on a computer-readable medium for interfacing, without requiring changes to a burst transfer serial component, a single transfer serial component and the burst transfer serial component whose single transfer protocol and burst transfer protocol are incompatible, comprising:
  providing a buffer and a memory connected to the single transfer serial component while the burst transfer serial component remains unchanged, using at least one signal line from a peripheral device as input and interrupt source for handshaking, and providing no further hardware modifications;
  processing a completion of transfer of a byte from the burst transfer serial component to the single transfer serial component as an interrupt source event;
  maintaining the current state of at least one line corresponding to the interrupt source event to prevent occurrence of a next interrupt source event;
  reading the transferred byte from the buffer and copying the transferred byte to the memory;
  ceasing the maintaining of the current state of the at least one line corresponding to the interrupt source event to allow occurrence of the next interrupt source event; and
  enabling sending of a next byte from the burst transfer serial component.

16. The computer program product of claim 15, wherein the interrupt source event is simulated by a polling event;
  preventing of the occurrence of a next interrupt source event prevents premature transfer of the next byte in the burst transfer causing the next byte to overwrite the buffer before it is sampled and copied; and
  the operation of the burst transfer component remains unchanged.

17. The computer program product of claim 15, wherein the interrupt source event is an edge of a busy line of the burst transfer component;
  the maintaining of the current state of at least one line corresponding to the interrupt source event to prevent occurrence of a next interrupt source event comprises disabling a clock line that controls transfer, causing the busy line of the burst transfer component to maintain the current state; and
  ceasing of the maintaining of the current state of the at least one line corresponding to the interrupt source event to allow occurrence of the next interrupt source event comprises enabling the clock line that controls transfer, causing the busy line of the burst transfer component to allow occurrence of an edge.

18. The computer program product of claim 15, wherein the transferred byte is at least one byte constituting a packet in a packet exchange protocol, wherein a completion of a transfer of a packet is processed as a packet transfer completion event; and wherein a packet comprises a packet header, a packet body, and a packet checksum, and wherein a first component sends a component a command packet, to which the second transfer component responds by sending back to the first component a status packet.

19. The computer program product of claim 15, wherein reading the transferred byte from a buffer and copying to memory is performed by a copying task, which waits on a blocking semaphore before reading and copying; and the interrupt source event invokes an interrupt handler task, which causes maintaining of the current state of at least one line corresponding to the interrupt source event to prevent occurrence of a next interrupt source event, and then signals the blocking semaphore.

20. The computer program product of claim 15, wherein at least one signal line generated from a first component is routed to a conversion component;

the conversion component converting the at least one signal line to produce at least one new signal compatible with a protocol of a second component; and feeding the converted at least one new signal to the second component.

* * * * *